United States Patent [19]

Hofstetter

[11] 4,009,351
[45] Feb. 22, 1977

[54] SWITCHING ARRANGEMENT FOR TELECOMMUNICATION SWITCHING SYSTEMS

[75] Inventor: Helga Hofstetter, Munich, Germany

[73] Assignee: Siemens Aktiengesellschaft, Munich, Germany

[22] Filed: Sept. 15, 1975

[21] Appl. No.: 613,639

[30] Foreign Application Priority Data

Sept. 13, 1974 Germany .................... 2443941

[52] U.S. Cl. ............................................. 179/18 GE
[51] Int. Cl.[2] ........................................ H04Q 3/68
[58] Field of Search ......................... 179/18 GE

[56] References Cited
UNITED STATES PATENTS

| 3,248,485 | 4/1966 | Warman | 179/22 |
| 3,581,018 | 5/1971 | Harland | 179/22 |

Primary Examiner—William C. Cooper

[57] ABSTRACT

A switching arrangement for a telecommunication system is described. A switching network having a plurality of switching matrices arranged in several stages are used, and a reverse trunking connecting arrangement is used. The switching network is divided into similarly constructed switching networks of two types. The first type switching network has only subscriber lines connected to its inputs. The second type switching network has connected to its inlets interexchange lines and switching equipment required for each connection. Special sub-control units are separately coupled to each switching network section. The switching network sections are each connected in parallel, at their outputs, to multiple lines.

2 Claims, 1 Drawing Figure

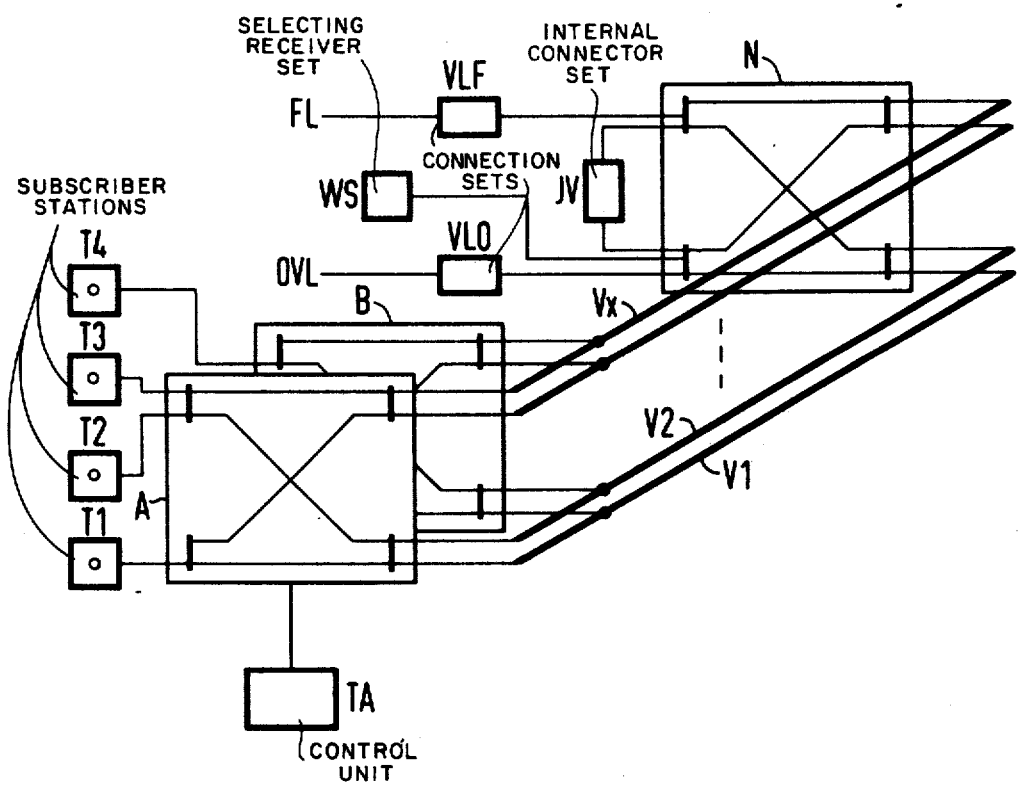

SWITCHING ARRANGEMENT FOR TELECOMMUNICATION SWITCHING SYSTEMS

BACKGROUND OF THE INVENTION

The invention relates to a switching arrangement for telecommunication switching systems, particularly telephone switching systems, and more particularly switching systems having a switching network made up of switching matrices in several switching matrix stages interconnected via links, wherein all trunks (e.g., subscriber lines, local interexchange trunks and long-distance trunks) and all inlets and outlets of switching equipments (e.g., selecting receivers, connector sets, and the like) necessary for the call setup and call supervision for each connection are connected to the inlets of the first switching matrix stage of the switching network, and wherein outlets of the switching matrices of the first until the next to last switching matrix stage are connected to the inlets of the switching matrices of the succeeding switching matrix stage and are capable of being interconnected in pairs therein.

A switching arrangement of the type referenced hereinabove has become known through U.S. Pat. No. 3,527,895 (FIG. 2). The trunking scheme of the switching network shown therein is known as the "reversed trunking scheme". In accordance with the reversed trunking scheme described in the latter patent the inlets of the switching network have connected thereto subscriber lines, local interexchange trunks, and all switching equipments necessary for the call setup and call supervision, evenly distributed throughout all the inlet switching matrices of the switching network.

Another technique known through U.S. Pat. No. 3,665,110 is to subdivide a switching network having a reversed trunking scheme into various switching network sections and to connect the outlets thereof individually in pairs from switching network section to switching network section. In this case, subscriber stations, local interexchange trunks, long-distance trunks, selecting receivers and all the switching equipments necessary for the call setup and call supervision are connected to each switching network section.

The problem to which the present invention is directed is to provide a means for the expansion in the simplest way possible of switching systems of the type defined hereinabove. In the switching system disclosed in U.S. Pat. No. 3,665,110, the addition of a further switching network section is difficult, because the outlets of the existing switching network sections are interconnected individually in pairs from switching network section to switching network section according to a very specific connection arrangement. In this prior art technique, when a switching network section is added, the pairwise interconnection of outlets of existing switching network sections should be eliminated at least in part and the arrangement of the interconnection changed.

In addition, when expanding telephone switching systems, it is impossible to predict if the switching equipments are to be enlarged with respect to increased internal, external, or transit traffic. Thus, when enlarging a switching system it can be a question of solely making connectable subscriber stations, internal connector sets and selecting receivers, but it can also be a question of solely making connectable connection sets, registers, and forwarding sets. Moreover, a switching system may have to be expanded in both respects.

It is an object of the present invention to provide means for expansion of a switching system of the type referred to hereinabove in the most adaptable way possible and to carry out any necessary provisions therefor on a limited scale only.

SUMMARY OF THE INVENTION

In accordance with the invention the foregoing and other objects are achieved in that the switching network is subdivided into similarly constructed switching network sections of a first type, to whose inlets only subscriber lines are connected and into similarly constructed switching network sections of a second type, to whose inlets only the interexchange lines and the switching equipments required for each call are connected. Special subcontrol units are individually assigned to the switching network sections. The switching networks sections are separately parallel-connected at their outlets, such that all like (i.e., with respect to the switching network parameters) switching network outlets of the various switching network sections of both types are separately interconnected in a number of multiples equal to the number of switching network outlets for each switching network section.

When it becomes necessary to enlarge a telephone switching system constructed according to the invention, an extra switching network section is connected on the outlet side to the existing switching network sections already connected in parallel thereat. The extra switching network section is assigned a special sub-control unit. A prespecified common number of outlets for the switching network sections is determined such that the multipled outlets of the various switching network sections can continue to accept the extra traffic load even after expansion. This is true up to a given final capacity stage. The advance provisions mentioned hereinabove comprise providing, at the crosspoints, and adequate prespecified number of switching network outlets per switching network section.

BRIEF DESCRIPTION OF THE DRAWING

The principles of the invention will be more readily understood by reference to the description of a preferred embodiment given hereinbelow in conjunction with the accompanying single FIGURE drawing which is a schematic diagram of a switching network constructed according to the invention.

DETAILED DESCRIPTION OF THE PREFERRED EMBODIMENT

The switching network in question is made up of switching network sections A, B, . . . , N. Each switching network section is two-stage. However, optionally, the switching network sections may also comprise three or more stages.

All the switching network sections have in the second switching matrix stage (on the right in the FIGURE) the same number of switching matrices, each switching matrix having the same number of outlets.

There are two types of switching network sections. On the outlet side, the switching network sections A and B are connected to subscriber stations only. Switching networks N and similar ones (not shown) are solely connected on the inlet side with line connector sets for local interexchange and longdistance trunks, with selecting receiver sets and with internal connector sets.

Due to the subdivision into switching network sections of a first type connected on the inlet side with subscriber stations T1, T2, T3 to T4 and into switching network sections of a second type connected on the inlet side with connection sets VLO and VLF for, respectively, local interexchange trunks OVL and long-distance trunks FG and with selecting receiver sets WS and internal connector sets JV, it is possible to design in a different way the switching network sections of the two different types. The design will depend on the varying traffic load of the subscriber stations and of the above-mentioned different switching equipments variously required for each connection.

As explained hereinabove, the number of switching matrices in the second switching matrix stage is the same in all the switching network sections. Likewise, the number of switching matrix outlets for each switching matrix of the second switching matrix stage for the entire second switching matrix stage is the same. The number of switching matrix inlets for the switching matrices of the second switching matrix stage in the switching matrix sections A and B of the first type is larger than in the switching matrix sections of the second type N. The number of switching matrices in the first switching stage per switching matrix section is as large as the number of inlets per switching matrix of the second switching stage. Accordingly, the switching matrix sections of the first type A and B each have a larger number of switching matrices in the first switching matrix stage than the switching matrix sections of the second type N. Since the number of outlets of the switching matrices of the first switching matrix stage always equals the number of switching matrices in the second switching matrix stage per switching matrix section, in all the switching matrix sections the switching matrices of the first switching matrix stage have the same number of outlets. However, the number of inlets per switching matrix of the first switching matrix stage may differ in the switching matrix sections of the first type A and B and in the switching matrix sections of the second type N on the other. In this case, the switching matrices of the first switching matrix stage have in the switching matrix sections of the first type a larger number of inlets than in the switching matrix sections of the second type. Thus, the switching matrix sections of the first type differ from the switching matrix sections of the second type both in the number of switching matrices of the switching matrix stage A per switching matrix section and in the number of inlets per switching matrix. The exact numbers of inlets and outlets per switching matrix and of switching matrices per switching matrix section are determined in the known manner, depending on the traffic intensities of the subscriber stations and on the switching equipments required for each connection.

As shown in the drawing, the switching matrix section A has a special sub-control unit TA. The other switching matrix sections, likewise, have special sub-control units. However, these are not shown in the drawing. All the sub-control units are in communication with a common central control unit. The operation of the sub-control units may be limited to that of buffers and/or code converters, details of which are shown and described in U.S. Pat. No. 3,665,110.

On the outlet side, the switching matrix sections are connected in parallel, for which multiple lines V1, V2 to Vx are employed. The number of said multiple lines remains unchanged throughout several expansion stages. When enlarging a telephone switching system constructed according to the invention, the extra switching section or sections are additionally connected to the multiple lines V1 to Vx in the manner shown in the drawing. Since in all switching matrix sections, i.e., both in the switching network sections of the first type and in those of the second type, the number of switching matrices of the second switching matrix stage equals the number of outlets of each of the switching matrices, there are no interconnection problems when the switching system is expanded. The like-designated (i.e., with respect to the switching network parameters) outlets of the extra switching network section or sections are simply connected additionally, one at a time, to the existing multiple lines.

Furthermore, there is the possibility of increasing the number of multiple lines V1 to Vx. This may become necessary if the number of switching network sections becomes so large that the multiple lines then existing can no longer carry the traffic load. In this case, provision is made that on the inlet side in all existing switching network sections a switching matrix is connected in parallel with each switching matrix of the second switching matrix stage. If the original switching matrices have the same number of outlets as the reconstructed switching matrices in the second switching matrix stage, the number of outlets per switching network section is doubled as a result. Thus, if the number of switching matrix sections exceeds a number permissible for the traffic carried by the multiple lines V1 to Vx, the number of multiple lines and, hence, the traffic capacity thereof can be doubled in the manner described hereinabove.

In conclusion, it should be noted that telecommunication switching systems of the type described in this application may also be employed for establishing connections for data transmission. In this case, data terminal equipments are connected to the inlets of the switching network sections, to whose inlets are connected the interexchange trunks and the switching equipments necessary for each connection.

The principles of the invention are described hereinabove by describing the construction and operation of a preferred embodiment constructed accordingly. The described embodiment is to be considered only as being exemplary, and it is contemplated that it can be modified or changed while remaining within the scope of the invention as defined by the appended claims.

I claim:

1. In a telecommunication switching system having a switching arrangement wherein there is a switching network comprising a plurality of switching matrices forming a plurality of switching stages, said stages being interconnected in sequence by links, the trunks and all switching equipment necessary for the completion and monitoring of a connection being connected to the inputs of the first stage of said switching network, the outputs of the switching matrices of the first through next to last switching matrix stages being connected to the inputs, respectively, of the next succeeding switching matrix stage, the improvement comprising:

pluralities of first and second types of switching network sections, each having a plurality of said switching stages interconnected by said links,
control means for each said switching network section, inputs of said first type of switching network section being connected to subscriber lines, inputs of said type of switching network section being connected to interexchange lines and to said switching equipment and a number of coupling multiples corresponding to the number of different outputs per switching network section, corresponding outputs of each said switching network section being connected in parallel to an individual coupling multiple.

2. The improved switching arrangement defined in claim 1 wherein data terminal apparatus are connected to inlets of said second type switching stages.

* * * * *